United States Patent [19]

Linn et al.

[11] 3,876,049

[45] Apr. 8, 1975

[54] SELF-ADJUSTING RELEASE MECHANISM FOR FRICTION CLUTCHES

[75] Inventors: Donald F. Linn, Manlius; George L. Wishart, North Syracuse, both of N.Y.

[73] Assignee: Lipe-Rollway Corporation, Syracuse, N.Y.

[22] Filed: Sept. 24, 1973

[21] Appl. No.: 399,996

[52] U.S. Cl. ... 192/111 A; 192/70.25; 188/79.5 GE; 188/196 BA
[51] Int. Cl. ..................... F16d 13/75; F16d 13/54
[58] Field of Search......... 192/111 A, 70.25, 111 R; 188/196 BA, 79.5 GE

[56] References Cited
UNITED STATES PATENTS

| | | | |
|---|---|---|---|
| 2,109,284 | 2/1938 | Brinck et al. | 188/196 BA |
| 2,160,752 | 5/1939 | Oliver | 192/111 A |
| 3,013,638 | 11/1961 | Satrum | 188/196 BA X |
| 3,154,178 | 10/1964 | House et al. | 188/196 BA |
| 3,202,247 | 8/1965 | Schmidt et al. | 192/111 A X |
| 3,473,632 | 10/1969 | Kimura et al. | 192/111 A X |

*Primary Examiner*—Samuel Scott
*Assistant Examiner*—Lance W. Chandler
*Attorney, Agent, or Firm*—Bruns & Jenney

[57] ABSTRACT

A self-adjusting release mechanism for disengaging a friction clutch. As wear occurs on the clutch disc facings, repositioning of parts of the release mechanism is required for proper operation. The mechanism includes inner and outer sleeves in threaded engagement with one another, the outer sleeve being operably connected to the release levers and the inner sleeve being connected to the release bearing. A pair of ring members are mounted on the inner sleeve in adjacent but spaced relation to one another and one of these members is formed with ratchet teeth while the other member includes pawls that bridge the space and engage the teeth. When the wear on the disc facings reaches a particular point, the space between the ring members decreases slightly causing the pawls to rotate the ring member with the ratchet teeth. This movement is transmitted to the inner sleeve which rotates relative to the outer sleeve whereby an axial adjustment between the two is effected to compensate for the wear.

6 Claims, 10 Drawing Figures

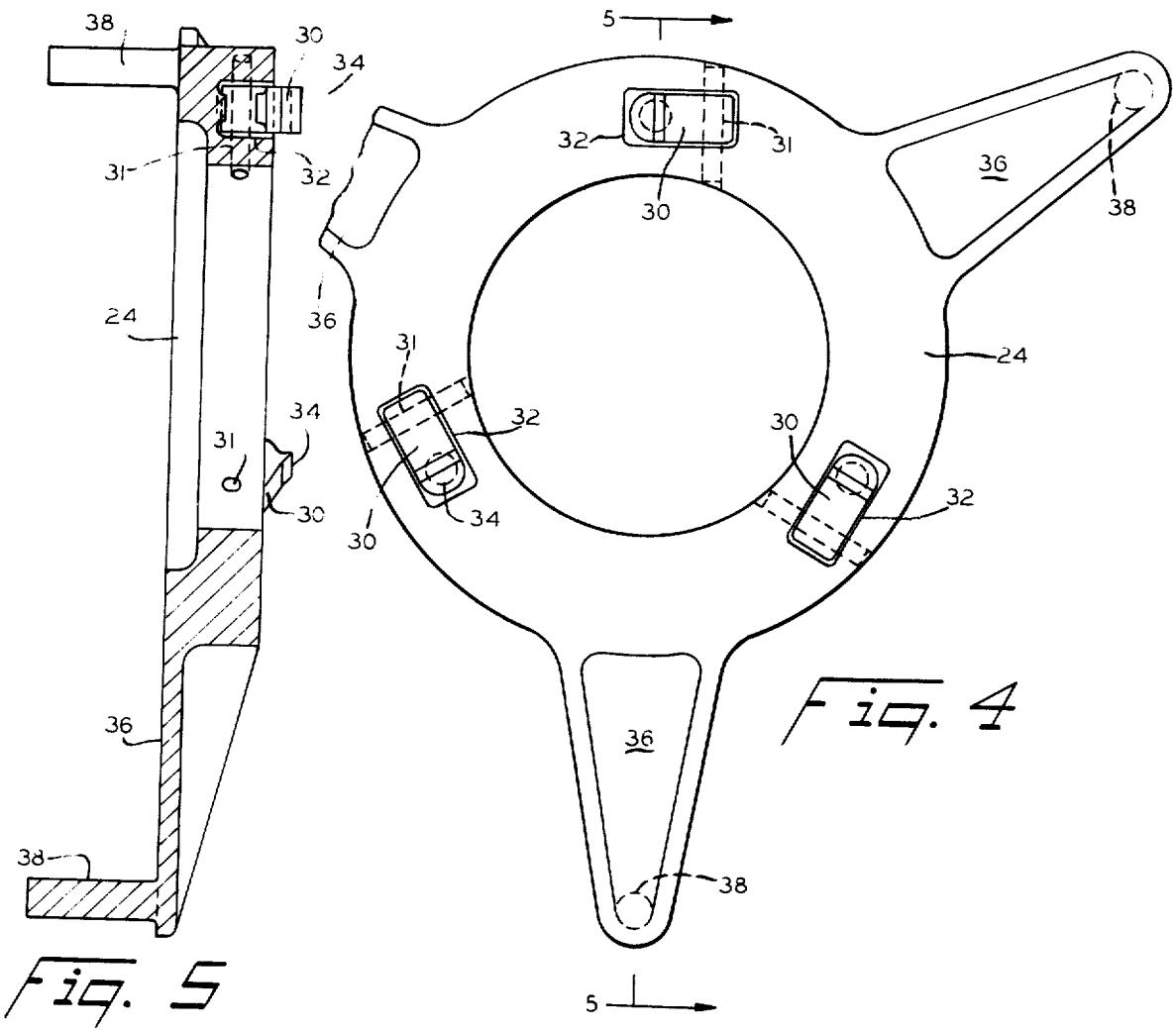
Fig. 5
Fig. 4
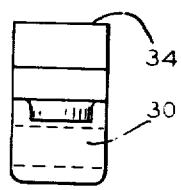
Fig. 7
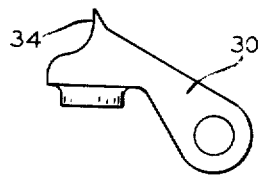
Fig. 6

3,876,049

SELF-ADJUSTING RELEASE MECHANISM FOR FRICTION CLUTCHES

BACKGROUND OF THE INVENTION

This invention relates generally to clutch release or throw-out mechanisms, and has particular reference to a novel self-adjusting release mechanism that automatically compensates for friction disc facing wear.

In friction type clutches, the driven disc or discs are disengaged from the driving flywheel and pressure plate by actuation of the release levers which are in turn actuated by axial movement of the release mechanism. Movement of the release mechanism is normally effected by a yoke member connected through a linkage to the clutch pedal of the vehicle. In engaged condition, the clutch driving and driven members are urged into engagement by pressure springs and as wear occurs on the clutch disc facings, these springs move the pressure plate closer to the flywheel.

The inward movement of the pressure plate results in a force which tends to change the normal position of the associated release levers and release mechanism and thereby to change the adjustment required for proper operation. Thus, if the free ends of the levers and the release mechanism move inwardly with the pressure plate, this may cause binding between the release bearing and yoke member or at some other point. If, on the other hand, the release mechanism is held against inward movement, binding may occur between the lever ends and spider portion of the release mechanism.

In the past, periodic manual adjustment of the operating mechanism has been required to compensate for wear. In one type of clutch, this is accomplished by changing the angle of the yoke member. In another type, the release lever spider includes a sleeve threadedly mounted on one end of a second sleeve having the release bearing mounted on its opposite end. This permits relative axial movement between the sleeves whereby the distance between the release lever ends and yoke member can be changed to compensate for wear. A release mechanism having manual adjustment means of this last-mentioned type is disclosed in U.S. Pat. No. 2,863,537 to Root, owned by the assignee of the present invention.

The only prior self-adjusting clutch release mechanism known to the applicants is disclosed in U.S. Pat. No. 3,433,341 to Bohn, et al. In this patent, the mechanism includes a collapsible or extendable release bearing carrier with ball bearings retained in an angled cavity of a sleeve member surrounding the carrier, permitting the assembly to controllably collapse or extend to reposition the release bearing with respect to the clutch. This mechanism is more complex than that of the present invention and appears to be considerably more expensive to manufacture.

The applicants herein have an earlier filed copending application, Ser. No. 356,723, filed May 3, 1973, that is directed to a different modification of the self-adjusting clutch release mechanism disclosed in the present application.

SUMMARY OF THE INVENTION

The self-adjusting release mechanism disclosed herein includes a first sleeve axially slidable on the driven or output shaft of the clutch and carrying the release bearing at one end. A second sleeve is threaded on the first sleeve adjacent its other end, the second sleeve carrying lugs engageable with the ends of the release levers for actuating same. Because of the threaded connection, relative movement between the sleeves is normally prevented.

In addition to the second sleeve, the first sleeve carries a pair of adjustment effecting members that are generally ring shaped, the members being spaced a small distance from one another. One of the adjustment members has a ring of ratchet teeth in one face thereof while the other member is provided with pawls that bridge the space and engage the teeth. Normally the space between the two members remains constant.

When wear on the clutch disc facings reaches a particular point, the space between the adjustment effecting members decreases slightly causing the pawls to rotate the member with the ratchet teeth. The latter is keyed to the first sleeve which causes it to rotate relative to the second sleeve whereby an axial adjustment is effected to compensate for the wear.

BRIEF DESCRIPTION OF THE DRAWINGS

FIG. 4 is a fragmentary rear elevation of the pawl carrying adjustment member;

FIG. 5 is a vertical section taken on line 5—5 of FIG. 4;

FIGS. 6 and 7 are enlarged side and front elevations, respectively, of one of the pawls;

DESCRIPTION OF THE PREFERRED EMBODIMENT

Figure 1:
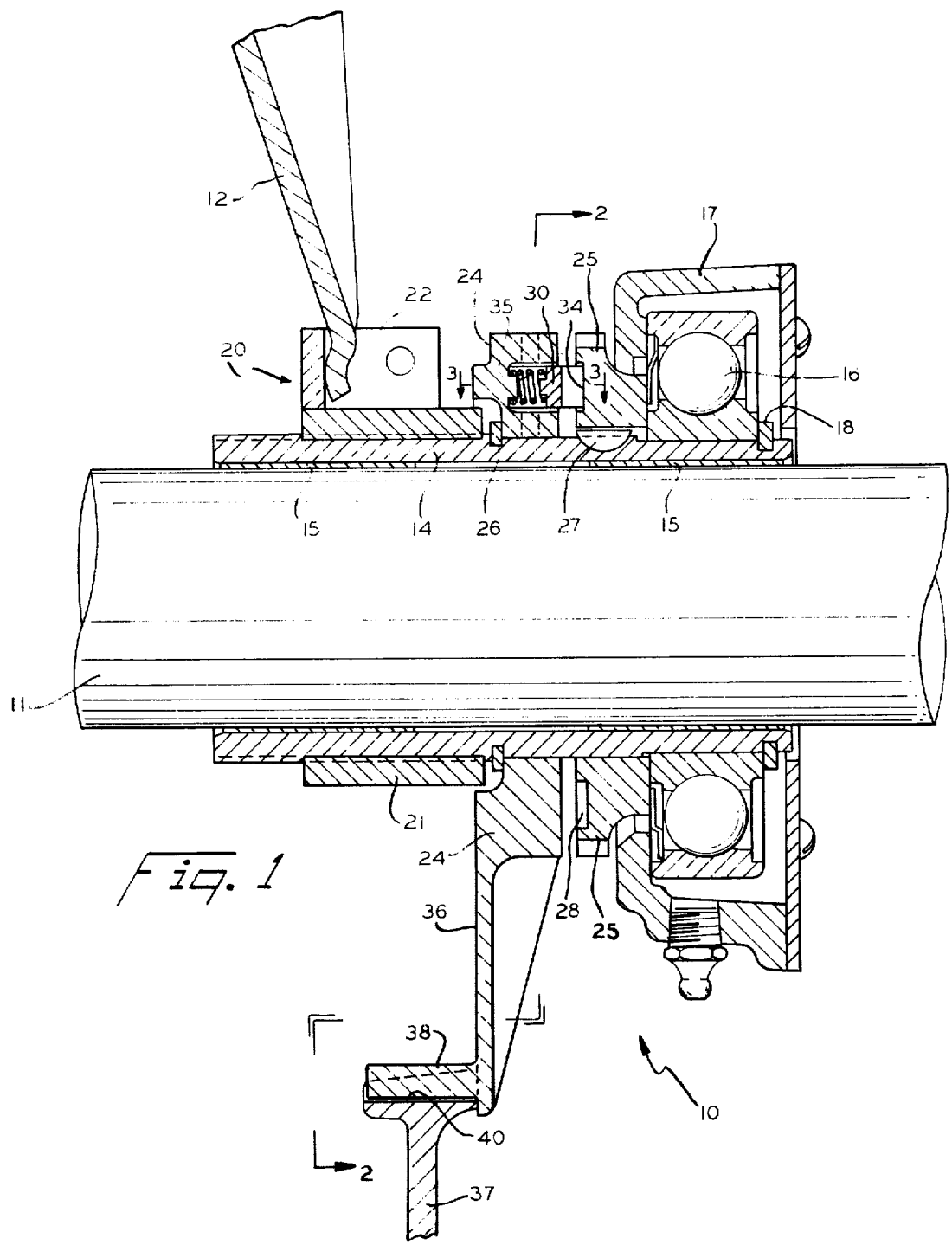
FIG. 1 is a vertical section through the clutch release mechanism of the invention.

Referring now to the drawings, the release mechanism that is shown forms a part of an otherwise conventional friction clutch such as that disclosed in Root U.S. Pat. No. 2,863,537, cited above. Accordingly, reference may be had to the Root patent for a description of the function and operation of the conventional clutch components, including the driven discs on the facings of which wear occurs.

The release mechanism, generally indicated at 10, is mounted for axial sliding movement on the driven or output shaft 11 and the inner (forward) end of the mechanism is in engagement with release levers 12 for actuation of same. The mechanism shown is for a pull type clutch meaning that it must be moved rearwardly or to the right in FIG. 1 to disengage the clutch. Such movement operates through the release levers to move the pressure plate (not shown) rearwardly and causes the driving connection between the driving and driven members to be disengaged.

Release member 10 includes a first or inner sleeve 14 separated from the driven shaft 11 by a pair of bushings 15. Mounted on the rear end of sleeve 14 is a release bearing 16 including the bearing housing 17. The inner race of the bearing is retained on the sleeve by a retaining ring 18.

A release lever spider 20 is threaded on sleeve 14 adjacent its forward end, the spider comprising a sleeve 21 and a plurality of circumferentially spaced lugs 22 for receiving the inner ends of the release levers 12. Relative axial movement between the inner and outer sleeves 14,21 is normally prevented by the threaded connection therebetween, the position of sleeve 21 on sleeve 14 being initially manually adjusted to insure proper operation of the mechanism.

In accord with the invention, adjustment for wear is carried out by a pair of adjustment effecting members 24 and 25 mounted on inner sleeve 14 to the rear of spider 20. Member 24 which is generally ring shaped normally abuts against a retaining ring 26 in a groove in sleeve 14 but can move axially in the other direction relative to the sleeve and can also move rotationally relative thereto. Adjustment effecting member 25, which is also ring shaped, is spaced from member 24 as shown and is nonrotatably connected to sleeve 14 by a key 27.

Figure 3:
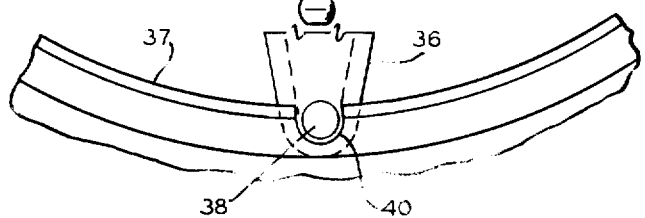
FIG. 3 is a top plan view of the two adjustment effecting members with a portion thereof being shown in section substantially as indicated by line 3—3 of FIG. 1.
Figure 3:
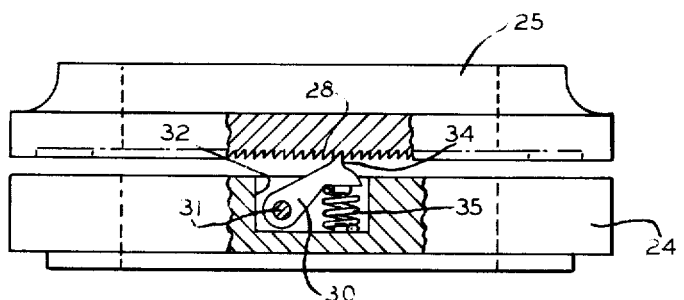
Figure 3:
Figure 8:
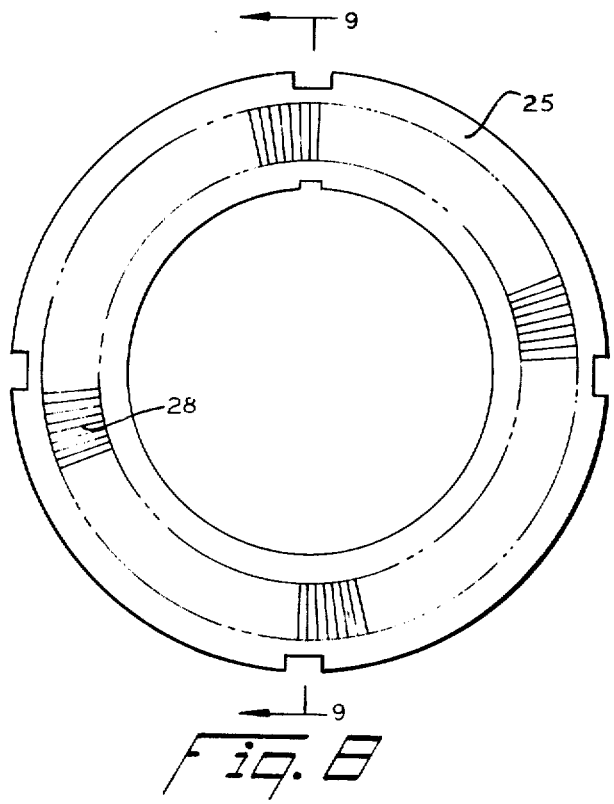
FIG. 8 is a front elevation of the adjustment member with the ratchet teeth.
Figure 9:
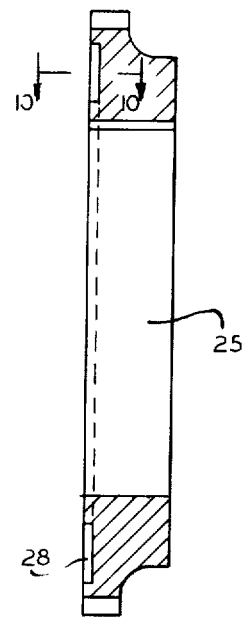
FIG. 9 is a vertical section taken on line 9—9 of FIG. 8.
Figure 10:
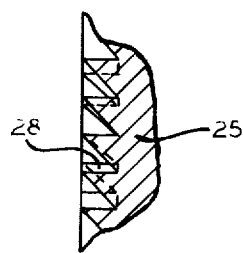
FIG. 10 is an enlarged section through the ratchet teeth taken on line 10—10 of FIG. 9.

On its rear side, member 25 abuts against the inner race of the release bearing 16. The forward face of member 25 is formed with a ring of ratchet teeth 28, FIGS. 1, 3, 8 and 10. Ratchet teeth 28 are engaged by a plurality of pawls 30 carried by the adjustment effecting member 24, there being three such pawls in the embodiment of the invention shown, see FIG. 4. Pawls 30, shown in detail in FIGS. 6 and 7, are pivotally mounted at 31 in recesses 32 in the rear face of member 24, and each pawl is formed with a wide toothlike projection 34 which engages the ratchet teeth, FIGS. 3 and 4–7. This engagement is maintained by relatively strong compression springs 35 positioned between the free ends of the pawls and bottoms of the recesses 32 as best shown in FIGS. 1 and 3, the springs and pawls being operable to normally maintain the spacing shown in FIG. 1 between members 24 and 25 whereby the former is held against retaining ring 26 and the latter against the inner race of the release bearing.

Figure 2:
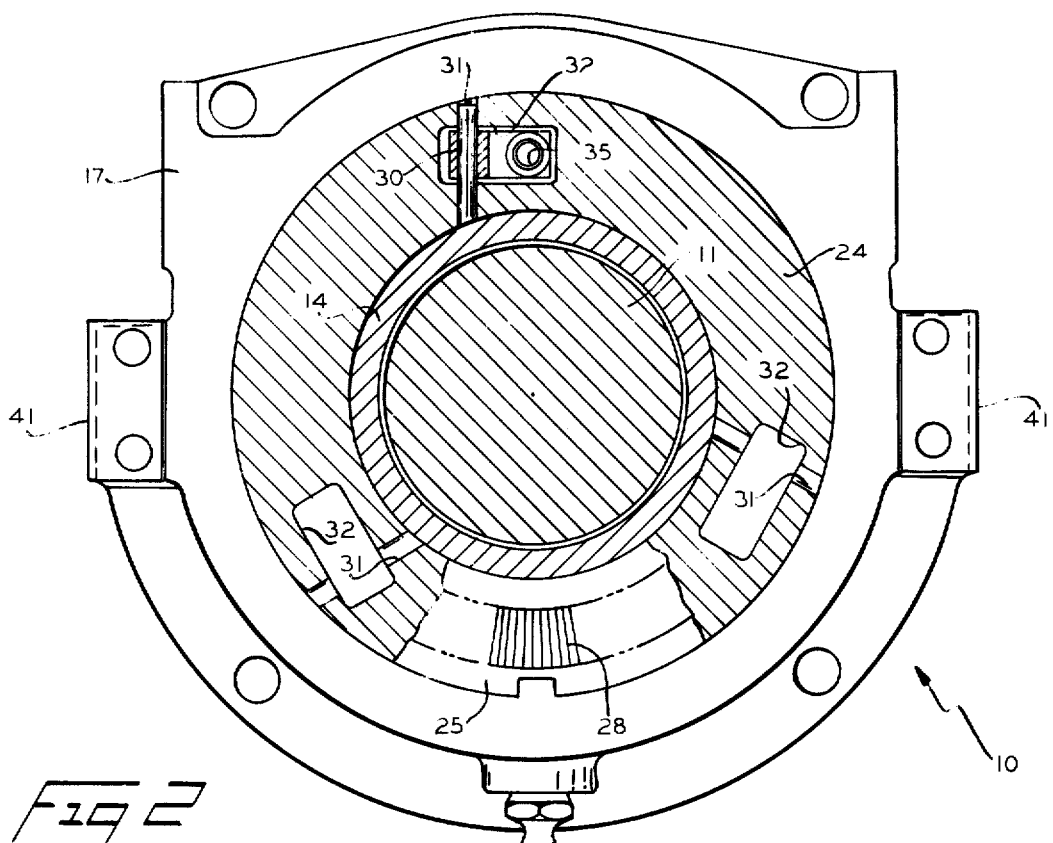
FIG. 2 is a transverse section through the mechanism taken on line 2—2 of FIG. 1.

Secured to the front side of the adjustment effecting member 24 are three circumferentially spaced arms 36, FIGS. 1 and 4, which project radially outwardly from the member. The retaining ring 26 positions member 24 so that the outer ends of the arms 36 abut against the clutch cover 37 when the clutch is engaged. To prevent relative rotation between member 24 and the cover, each arm 36 is provided with a forwardly extending dowel 38 that is received in a notch 40 in the cover, FIGS. 1 and 2.

In normal operation of the release mechanism, without consequential wear on the driven disc facings, disengagement of the clutch is as follows: Release mechanism 10 is moved to the right, FIG. 1, or rearwardly by a clutch pedal actuated yoke (not shown) which engages a pair of side lugs 41, FIG. 2, on the release bearing housing 17. The yoke pull is transmitted through the release bearing 16, retaining ring 18 and sleeve 14 to the spider 20 whereby the release levers are actuated to disengage the clutch. When the clutch pedal is released, the release mechanism will be returned to its starting position in the conventional manner to reengage the clutch.

When the wear on the disc facings is no longer inconsequential so that adjustment is required, the adjustment is automatically made during re-engagement of the clutch, or as the release mechanism moves forwardly (to the left in FIG. 1). Thus, when the release levers 12 reach their starting position, the arms 36 on the adjustment effecting member 24 contact the clutch cover 37 and prevent further forward movement of the member. Due to the wear, however, the pressure plate and attached release levers are able to move farther forward toward the flywheel and are strongly urged to do so by the usual pressure springs (not shown) acting on the pressure plate. This causes the free ends of the release levers to continue to urge spider 20 forward beyond its starting position.

The further forward movement of spider 20 is transmitted through sleeve 14, retaining ring 18 and the inner race of bearing 16 to the adjustment effecting member 25. Since member 24 is held by arms 36 against further forward movement, the forward movement of member 25 causes the space between the two members to decrease and this in turn causes the pawls 30 on member 24, FIGS. 1 and 3, to be pushed farther into their recesses against the action of springs 35. Pushing the pawls farther into their recesses causes the free ends thereof to pivot slightly and this operates to rotate the member 25 by reason of the engagement of the pawl projections 34 with the ratchet teeth. The rotation of member 25 is relative to member 24 which is held against rotation by the engagement of the dowels 38 on arms 36 with the cover notches 40. The rotation of member 25 is to the right as viewed in FIG. 3 or clockwise as viewed in FIG. 2.

The rotation of member 25 is transmitted through key 27 to sleeve 14 whereby the latter rotates relative to spider 20. Spider 20 is prevented from rotating with the sleeve 14 because of its engagement with the release levers 12. The relative rotation between the sleeve and spider has the effect of increasing the distance between the spider and release bearing housing 17 and this in turn permits the spider, release levers and pressure plate to assume a position (when the clutch is engaged) closer to the flywheel, thereby compensating for the wear. After the rotation of the sleeve relative to the spider, the spacing between members 24,25 is restored to its original distance which is maintained by springs 35 until further wear on the disc facings reaches the point where another adjustment is called for.

From the foregoing description it will be apparent that the invention provides a novel self-adjusting release mechanism that can effectively reduce vehicle down time and maintenance costs. As will be understood by those familiar with the art, the invention may be embodied in other specific forms without departing from the spirit or essential characteristics thereof.

We claim:

1. In a friction clutch for connecting driving and driven shafts, the clutch having means for normally effecting a driving connection between the shafts and release levers actuatable to disengage said driving connection, the improvement comprising a first sleeve member axially slidable on the driven shaft, a second sleeve member threadedly engaging the first sleeve member, means on the second sleeve member engageable with the release levers for actuating same whereby axial movement of the first sleeve member in one direciton operates to correspondingly move the second sleeve member and actuate the release levers, a first adjustment effecting member non-rotatably mounted on the first sleeve member, and a second adjustment effecting member mounted on the first sleeve member in confronting relation to the first adjustment effecting member, the second adjustment effecting member normally moving axially with the first sleeve member and including means to positively limit the extent of its axial movement in one direction, the first and second adjustment effecting members coacting when the driving connection wears to rotate the first sleeve member relative to the second sleeve member thereby causing relative axial movement between said members which compensates for the wear.

2. A friction clutch as defined in claim 1 wherein the first adjustment effecting member is provided with ratchet teeth and the second adjustment effecting member is provided with at least one pawl in engagement with the teeth, the pawl being operable when the driving connection wears to rotate the first sleeve member.

3. A friction clutch as defined in claim 1 including a cover, and wherein the movement limiting means of the second adjustment effecting member comprises at least one outwardly projecting arm arranged to abut against the cover.

4. In a friction clutch for connecting driving and driven shafts, the clutch having means for normally effecting a driving connection between the shafts and release levers actuatable to disengage said driving connection, the improvement comprising a first sleeve axially slidable on the driven shaft, a second sleeve threaded on the first sleeve adjacent one end thereof, means on the second sleeve engaging the release levers whereby axial movement of the first sleeve in one direction operates to correspondingly move the second sleeve and actuate the levers, a first ring member nonrotatably mounted on the first sleeve, said ring member having an annulus of ratchet teeth in one face thereof, and a second ring member mounted on the first sleeve for axial and rotational movement relative thereto, the second ring member being adjacent to but spaced from the first ring member and being provided with a plurality of pawls which bridge the space between the members and engage the ratchet teeth, the first and second ring members being operable when the wear on the clutch driving connection reaches a particular point to move closer together whereby the pawls rotate the first ring member and first sleeve relative to the second sleeve causing relative axial movement between the sleeves which compensates for the wear.

5. A friction clutch as defined in claim 4 wherein the second ring member normally moves axially with the first sleeve member, said ring member including means to positively limit the extent of its axial movement in one direction.

6. A friction clutch as defined in claim 5 including a cover, and wherein the movement limiting means of the second ring member comprises at least one outwardly projecting arm arranged to abut against the cover.

* * * * *